United States Patent
Fischer et al.

(10) Patent No.: US 12,292,359 B2
(45) Date of Patent: May 6, 2025

(54) LONG-DURATION SHOCK TESTING MACHINE

(71) Applicant: Omnitek Partners LLC, Ronkonkoma, NY (US)

(72) Inventors: Jacques Fischer, Sound Beach, NY (US); Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 17/555,609

(22) Filed: Dec. 20, 2021

(65) Prior Publication Data
US 2022/0196515 A1 Jun. 23, 2022

Related U.S. Application Data

(60) Provisional application No. 63/128,111, filed on Dec. 20, 2020.

(51) Int. Cl.
*G01N 3/30* (2006.01)
*G01M 7/08* (2006.01)
*G01M 3/30* (2006.01)

(52) U.S. Cl.
CPC ............... *G01M 7/08* (2013.01); *G01M 3/30* (2013.01)

(58) Field of Classification Search
None
See application file for complete search history.

(56) References Cited

U.S. PATENT DOCUMENTS

| | | | | |
|---|---|---|---|---|
| 3,577,763 A | * | 5/1971 | Beal | G01N 3/303 |
| | | | | 73/12.06 |
| 2007/0266764 A1 | * | 11/2007 | Goyal | G01N 3/303 |
| | | | | 73/12.09 |
| 2016/0161362 A1 | * | 6/2016 | Rastegar | G01M 7/08 |
| | | | | 73/12.07 |
| 2016/0258837 A1 | * | 9/2016 | Rastegar | G01N 3/307 |

* cited by examiner

*Primary Examiner* — Jill E Culler
*Assistant Examiner* — Ruben C Parco, Jr.

(57) ABSTRACT

A shock testing machine including: a test platform for holding an item to be shock tested; a carriage for carrying the test platform and being movable relative to the test platform in a testing direction, the testing direction being a direction of movement of the carriage; one or more rails movably supporting one of the test platform and the carriage; a stop configured to stop the carriage from moving in the testing direction at a predetermined location while allowing the test platform to continue moving in the testing direction past the predetermined location; and a brake configured to decelerate the test platform after the carriage has been stopped by the stop.

10 Claims, 12 Drawing Sheets

LONG-DURATION SHOCK TESTING MACHINE

CROSS-REFERENCE TO RELATED APPLICATION

This application claims priority to U.S. Provisional Application No. 63/128,111 filed on Dec. 20, 2020, the entire contents of which is incorporated herein by reference.

BACKGROUND

1. Field

The present disclosure is generally directed to long-duration high-G shock testing machines, and more particularly to low-cost fast set-up and reusable testing machines and methods capable of imposing high accelerations and decelerations that are sustained over long durations (>5 msec). Such machine would provide the means for testing ordnance and commercial products/components under high-G shock loading.

2. Prior Art

Gun-fired munitions, mortars and rail-gun munitions are subjected to high-G (setback and set-forward) acceleration during launch and target impact. Rockets are generally subjected to lower G accelerations but for significantly longer durations. High-G accelerations are also experienced during impact in munitions and in many other devices during their planned operation. Similar but more complex combinations of axial as well as lateral and bending shock loadings are experienced by air dropped weapons as they impact the target, particularly when the weapon is rocket assisted to achieve high impact velocities and when the target structure is highly heterogeneous, such as reinforced concrete or soil with large rock content. As a result, all components of the system and the system itself must survive such shock loading events and be qualified to such severe environments. High-G loading is also experienced by almost all objects during accidental drop or other similar accidental events.

Component qualification testing cannot obviously be done in an actual environment on complete assemblies. In addition to prohibitive cost involved, testing of components in actual environments would not provide the required information for determining the required component and system design margins. For these reasons, laboratory simulations of the shock loading environments are highly desirable for testing individual components, subassemblies and sometimes the complete system assembly.

In the current state of the art, shock loading environments are simulated in the industry by one of the following methods:

1. Electro-Dynamic Shaker.

This method can accurately produce a desired shock response spectrum (SRS) within closely specified tolerances, but amplitude and frequency limitations of the equipment greatly restrict its applicability.

2. Live Ordnance with System Structure.

Since the actual system structure and live ordnance are used, this method has the potential to produce a shock virtually identical to the expected field environment. The cost of the test structure, however, is usually prohibitive, unless large numbers of identical tests are to be conducted. The use of live ordnance may have a wide repeatability tolerance, and does not easily allow the test levels to be increased so that an adequate design margin can be assured. For the case of gun-fired munitions, mortars and the like, the added problem is the "soft" recovery of the launched round to examine the state of the components being tested. In certain case, telemetry of data may be used to transmit back data related to the operation of certain components. However, in most cases it is highly desirable to examine the state of the components post firing. In addition, in many cases it is extremely difficult if not impossible to measure/determine the effect of shock loading on many components for transmission to a ground station via telemetry.

3. Live Ordnance with Mock Structure.

This method has most of the same features as the method "2" above, except that some cost savings are attributed to the use of a mass mock-up structure. These savings may be negated by the need for some trial-and-error testing to attain the desired component input, where geometric similarity was used in method "2" above to attain the same result. This method also suffers from the same shortcomings for testing components of gun-fired munitions and mortars and the like as indicated for the above method "2".

4. Live Ordnance with Resonant Fixture.

This method further reduces test cost, and is a candidate for general purpose testing, due to the use of a generic resonant plate fixture. Since live ordnance is used, all the very high frequencies associated with near-field pyrotechnic shock events are produced with this method. However, a great amount of trial-and-error testing may be required to obtain the desired component input.

5. Mechanical Impact with Mock Structure.

Mechanical impacts do not produce the very high frequencies associated with the stress pulse in the immediate vicinity of a pyrotechnic device. However, most components in a typical system are isolated by enough intermediary structure such that the shock at the component location is not dominated by these very high frequencies. Instead, the shock at the component is dominated by the structural response to the pyrotechnic device, and has dominant frequencies which are typically less than 10 KHz. For these components, a mechanical impact (e.g. using a projectile or pendulum hammer) can produce a good simulation of the pyrotechnic shock environment. Test amplitudes can easily be increased or decreased by simply increasing or decreasing the impact speed. The shock level and duration can be controlled to some extent by the use of various pads affixed at the point of impact. According to this method, attempt is made to subject the structure containing the test components the impact induced acceleration (shock) profile, which close to that experienced when assembled in the actual system. The test conditions are experimentally adjusted to achieve an approximation of the actual acceleration (shock) profile. In general, a large amount of trial-and-error runs have to be made to achieve an acceptable acceleration (shock) profile. The characteristics and response of the various pads used at the impact point to increase the duration of the shock (acceleration) event is generally highly variable and dependent on temperature and moisture. In addition, due to inherent design of such mechanical impact machines and the limitations on the thickness of the pads that can be used at the impact point, high G acceleration peaks with long enough duration similar to those, e.g., experienced by munitions fired large caliber guns or mortars, cannot be achieved. For example, to achieve a peak shock acceleration level of 5000 G with a duration of 4 milliseconds, the said pad deformation has to be well over 0.6 meters (considering a reasonable ramp-up and ramp-down of 0.1 meters each), which is highly impractical. It is also appreciated by those skilled in the art that for simulating firing (setback) acceleration for most gun-fired munitions and mortars, the peak acceleration levels can generally be well over the considered 5000 Gs with significantly longer durations. It can therefore be concluded that the described mechanical impact machines do not accurately duplicate the shock profile experienced by munitions during firing or target impact and are not suitable for accurate shock testing of components to be used in such munitions.

6. Mechanical Impact with Resonant Fixture.

In this method, a resonant fixture (typically a flat plate) is used instead of a mock structure. This significantly reduces cost, and allows for general purpose testing since the fixturing is not associated with a particular structural system. The mechanical impact excites the fixture into resonance which provides the desired input to a test component mounted on the fixture. Historically, test parameters such as plate geometry, component location, impact location and impact speed have been determined in a trial-and-error fashion. In general, this method produces a simulated environment which has its energy concentrated in a relatively narrow frequency bandwidth. It should be noted here that a suitable resonant fixture for use in this method may also be a bar impacted either at the end or at some point along the length of the bar. This method is suitable for many applications in which the components are subjected to relatively long term vibration such as those induced by the system structure. The method is, however, not suitable for testing components of gun-fired munitions and the like since in such cases the munitions is subjected primarily to a single very high G setback or impact shock with relatively long duration.

7. Air-Gun Testing Platforms.

In this method, the components to be tested are usually mounted in a "piston" like housing with appropriate geometry. In one method, the said "piston" is then accelerated by the sudden release of pressurized air or accelerated by the rupture of a diaphragm behind which air pressure is continuously increased until the diaphragm is failed in sheared. In another type of air gun a similar air tight "piston" within which the components to be tested are securely mounted is accelerated over a certain length of a tube by pressurized gasses. The "piston" is thereby accelerated at relatively slower rates and once it has gained a prescribed velocity, the "piston" existing the tube and impacts decelerating pads of proper characteristics such as aluminum honeycomb structures to achieve the desired deceleration amplitude and duration. The components are assembled inside the "piston" such that the said deceleration profile to correspond to the desired actual shock (acceleration) profile. In general, similar to the above method 5, air guns can be used to subject the test components to high G shock (acceleration) levels of over 30,000 Gs but for durations that are significantly lower than those experienced by gun-fired munitions, mortars and the like. It can therefore be concluded that the described mechanical impact machines do not accurately duplicate the shock profile experienced by munitions during firing or target impact and are not suitable for accurate shock testing of components to be used in such munitions.

8. Rocket Sleds.

Rocket sled is a test platform that slides along a set of rails, propelled by rockets. As its name implies, a rocket sled does not use wheels. Instead, it has sliding pads, called "slippers", which are curved around the head of the rails to prevent the sled from flying off the track. The rail cross-section profile is usually that of a Vignoles rail, commonly used for railroads. Rocket sleds are used extensively aerospace applications to accelerate equipment considered too experimental (hazardous) for testing directly in piloted aircraft. The equipment to be tested under high acceleration or high airspeed conditions are installed along with appropriate instrumentation, data recording and telemetry equipment on the sled. The sled is then accelerated according to the experiment's design requirements for data collection along a length of isolated, precisely level and straight test track. This system is not suitable for testing components for gun-fired munitions and mortars and the like since it can produce only around 100-200 Gs.

9. Soft Recovery System Facility (SCat Gun)

In this system, the components to be tested are packaged inside a round, which is fired by an actual gun (in the current system located at the U.S. Army Armament Research, Development and Engineering Center (ARDEC) in New Jersey, with a 155 mm round being fired by a 155 mm Howitzer weapon with a M199 gun tube and 540 feet of catch tubes). The projectile is then recovered using a "Soft Recovery" system. The soft catch component of the system uses both pressurized air and water to help slow down the projectile. The first part of the chain of catch tubes only contains atmospheric air. The next section, 320 feet of the tubes, contains pressurized air, followed by an 80 feet section that is filled with water. A small burst diaphragm seals one end of the pressurized air and a piston seals the other end. The piston also separates the water and pressurized air sections. The burst diaphragm and piston are replaced after each test fire. Once fired, the projectile achieves free flight for approximately 6 feet and travels down the catch tubes, generating shockwaves that interact with the atmospheric air section, the burst diaphragm, the pressurized air section, the piston and the water section. The air section is compressed and pushed forward and shock and pressure cause the piston move against the water, all while slowing the projectile to a stop. Then the piston is ejected out of the end of the system, followed by the air and water, and finally the projectile comes to rest in a mechanized brake system. On-board-recorders inside the projectile measure the accelerations of the projectile from the gun-launch and the catch events. This system is currently provides the means to subject the test components to as realistic firing shock loading conditions as possible and provide the means to retrieve the round to examine the tested components. The cost of each testing is, however, very high, thereby making it impractical for use for engineering development. The system is also impractical for use for most reliability testing in which hundreds and sometimes thousands of samples have to be tested and individually instrumented. It also takes hours to perform each test.

The methods 1-6 described above are more fully explained in the following references: Daniel R. Raichel, "Current Methods of Simulating Pyrotechnic Shock", Pasadena, Calif.: Jet Propulsion Laboratory, California Institute of Technology, Jul. 29, 1991; Monty Bai, and Wesley Thatcher, "High G Pyrotechnic Shock Simulation Using Metal-to-Metal Impact", The Shock and Vibration Bulletin, Bulletin 49, Part 1, Washington D.C.: The Shock and Vibration Information Center, September, 1979; Neil T. Davie, "The Controlled Response of Resonating Fixtures Used to Simulate Pyroshock Environments", The Shock and Vibration Bulletin, Bulletin 56, Part 3, Washington D.C.: The Shock and Vibration Information Center, Naval Research Laboratory, August 1986; Neil T. Davie, "Pyrotechnic Shock Simulation Using the Controlled Response of a Resonating Bar Fixture", Proceedings of the Institute of Environmental Sciences 31st Annual Technical Meeting, 1985; "The Shock and Vibration Handbook", Second Edition, page 1-14, Edited by C. M. Harris and C. E. Crede, New York: McGraw-Hill Book Co., 1976; Henry N. Luhrs, "Pyroshock Testing-Past and Future", Proceedings of the Institute of Environmental Sciences 27th Annual Technical Meeting, 1981.

The aforementioned currently available methods and systems for testing components to be used in systems that subject them to acceleration (shock) events have a number of shortcomings for use to simulate high G acceleration (shock) events with relatively long duration, such as those encountered in large caliber guns and mortars, for example, to simulate gun-firing events with setback accelerations of over 3000 G-5,000 Gs and durations of around 5-10 milliseconds. Firstly, most of the available methods and devices, except those that are based on actual firing of the projectile from the actual gun or mortar or the like, cannot provide long enough acceleration pulse duration. Secondly, those methods that are based on actual firing of the projectile from the actual gun or mortar or the like have prohibitive cost, thereby making them impractical for engineering development tasks which requires countless iterations to achieve the desired results for individual components as well as for their assemblies. In addition, reliability tests for munitions components required testing of a very large number of components, which would make the total cost of munitions development prohibitive. Thirdly, in many component tests, it is highly desirable to instrument each component so that its behavior during the total shock environment can be monitored. Such instrumentation and monitoring is very difficult to achieve when the components to be tested have to be assembled in a rather small volume of fired projectiles.

Developing a controllable test method and predictive capability to apply this environment in testing is critical to the development of fuze, energetic, and other weapon technologies and for the development of products that can survive accidental drops or impact due to transportation vibration and the like. In munitions and other similar systems, to subject the device or system to the required acceleration events typically requires ballistic or operational testing. Both testing methods are extremely costly, personnel intensive, and introduce both technical and safety risks.

The vast majority of aircraft and satellite components, whether military or commercial, must be tested under certain shock loading conditions. That is, aircraft components must be shock tested to ensure that their design will survive its intended environment. Consequently, different aircraft components may have widely varying shock testing requirements. Currently, there is no one shock testing apparatus that can shock test aircraft components to accommodate the varying shock testing requirements for aircraft components, if at all. Thus, the industry resorts to building specialized shock testing machines or using computer simulation for shock testing, methods which are expensive and/or inaccurate.

In addition to rigorous vibration profiles, many consumer electronic components must be shock tested to determine how they will perform under certain shock conditions. Electronic components are often shock tested to determine how they will survive under unintended conditions, such as repetitive dropping. Of such consumer electronic components, device casings and circuit boards are often shock tested to determine survivability due to abuse while other electronic devices are designed for heavy duty usage, such as in the construction trade and must be shock tested to determine if they are fit for their particular harsh environment. The current shock testing methods for consumer electronic devices have the same shortcomings as those described above regarding commercial aircraft. Current shock testing machines in the consumer electronics area are either very simple drop testing from heights or pneumatic shock machines, both of which are inaccurate, and their repeatability is unreliable.

Automobile components (as well as light and heavy-duty truck components) must also undergo rigorous shock testing under normal use as well as components which can fail during a crash. Some automobile components must undergo shock testing to determine how they will perform under normal conditions, such as some structural frame components while other components must undergo shock testing to determine their performance during a crash, such as electronic components, steering wheels, airbags and the like. Like other shock testing machinery currently available in the areas of commercial aircraft and consumer electronics, the shock testing of automobile components is inaccurate, their repeatability is unreliable, and they can also be relatively expensive.

In addition, currently available high-G shock loading machines, even those applying relatively low accelerations levels in the range of, for example 10 G-500 G, are not capable of applying the acceleration over relatively long durations, for example 500 G over 10 milliseconds.

The basic design of a mechanical shock testing machine 10 of prior art that uses the aforementioned method "6" is shown in the schematic of FIG. 1. The schematic of FIG. 1 is intended to show only the main components of such a mechanical shock testing machine. The mechanical shock machine 10 is constructed with some type of rails 12 along which the impact mass element 11 travels. The rails (one or more) may have any cross-sectional shape and the sliding surfaces between the mass element 11 and the rails 12 may be covered with low friction material or may utilize rolling elements to minimize sliding friction. The rails 12 are generally mounted on a relatively solid and massive base 13, which in turns rests on a firm foundation 14. Certain relatively stiff shock absorbing elements (not shown) may be provided between the base 13 and the ground 14 to prevent damage to the foundation structure. In heavier machinery, a relatively large (usually made out of reinforced concrete) foundation block (not shown) is used with shock isolation elements having been positioned between the foundation block and the surrounding structure.

The components to be tested 15 are attached fixedly to the mass element 11, usually via a fixture 16. In the mechanical shock machine 10, the mass element 11 acts as a "hammer" that is designed to impact an anvil 17, FIG. 1, to impart the desired shock loading (deceleration profile in the present mechanical shock testing machine) onto the components 15 that are to be tested. The anvil 17 is generally desired to be very rigid as well as massive and be securely attached to the base 13 of the mechanical shock testing machine, FIG. 1. In many cases, the mass element 11 is provided with an impact element 18, which is designed to have a relatively sharp and hard tip 19.

To perform shock testing of the components 15, the mass element 11 ("hammer" element) is accelerated downwards in the direction of the arrow 20 towards the anvil 17. The present shock testing machines are usually installed vertically. In which case and when relatively low impact shock (deceleration) levels or very short shock durations are desired, the mass element 11 is accelerated in the direction of the arrow 20 under the gravitational acceleration, with the height of travel determining the level of velocity attained by the mass element ("hammer") at the time of impacting the anvil 17. In other mechanical shock testing machines, particularly when higher mass element 11 velocity at impact velocity is desired, other means such as pre-tensioned bungee cords or pneumatic cylinders (not shown) are also used to significantly increase downward acceleration of the mass element 11 (in the direction of the arrow 2), thereby significantly increasing the impact speed between the mass element 11 (the "hammer" element) and the anvil 17. In those cases in which the mechanical shock testing machine 10 is installed horizontally (not shown), the mass element 11 is accelerated in the direction of the arrow 20 by the aforementioned pre-tensioned bungee cords or pneumatic cylinders or even linear motors.

The shock (deceleration) level experienced by the mass element 11 and thereby the test components 15 and its duration can be controlled to some extent by the use of various pads 21 affixed at the point of impact, i.e., between the anvil 17 surface and the impacting tip 19 of the impact element 18 of the mass element 11 ("hammer"). The shock (deceleration pulse) amplitude is also increased or decreased by simply increasing or decreasing the impact speed. The test conditions are experimentally adjusted to achieve as close approximation of the actual acceleration (shock) profile as possible.

SUMMARY

It is therefore an object to develop a low-cost, reusable testing method and accompanying experimental and simulation capabilities that can reproduce acceleration/time profiles representative of munitions firing, weapon target penetration as well as shock loading experienced by various weapon systems and commercial products. This includes the experienced acceleration amplitude for a duration.

It is also appreciated that it is critical that the shock testing system be scalable so that they would enable testing of both small and larger devices and systems. In this regard, the shock testing system can test articles ranging from circuit boards for consumer electronics weighing several ounces to ordnances/components weighing several pounds.

A need therefore exists for the development of novel methods and resulting testing apparatus (shock testing machines) for testing components of gun-fired munitions, mortars and other devices and systems that are subjected high G acceleration (shock loading) with a relatively long duration such as projectiles fired by large caliber guns, mortars and the like. The developed methods should not be based on the use of the actual or similar platforms, for example, firing projectiles carrying the test components with similar guns such as the described in the method "9" above, due to the cost and difficulty in providing full instrumentation which would allow testing of a few components at a time, thereby making the cost of engineering development of such components and their reliability testing which requires testing of a large number of samples prohibitively high.

A need therefore exists for the development of novel methods and resulting testing apparatus (shock testing machines) for testing components of munitions such as rockets and other devices and systems that are subjected relatively low G acceleration (shock loading in tens of G rather than hundreds and thousands in the case of gun-fired munitions and mortars and those experienced during impact and the like) with relatively long duration. The developed methods should not be based on the use of the actual or similar platforms, for example, firing rockets carrying the test components, due to the cost and difficulty in providing full instrumentation which would allow testing of a few components at a time, thereby making the cost of engineering development of such components and their reliability testing which requires testing of a large number of samples prohibitively high.

A need also exists for novel mechanical shock testing machines that can provide the means of testing a large number of fully instrumented components in a relatively short time. This requires that the said mechanical shock testing machine allows rapid mounting of test components onto the test platform while allowing relatively free access to the said components, unlike the "piston" platforms used in air guns (aforementioned method "7") or inside projectiles that are gun-launched (aforementioned method "9").

The novel mechanical sock testing must also provide highly predictable and repeatable shock loading (acceleration) provide for testing the intended components so that the results can be used for detailed analytical model validation and tuning; for predicting the performance of the components in actual applications; and for providing the required information for the configuration of the said components and optimization of the developed configurations.

Herein is described a novel method for the configuration of shock testing machines and the resulting shock testing machines that can subject test components and systems to long duration high G acceleration pulse (shock) events. The resulting shock testing machines are shown to address the aforementioned needs and are particularly suitable for engineering development and testing of components to be used in gun-fired munitions, mortars and the like. The method is also shown to be capable of providing a configuration of shock loading machines for a wide range of accelerations and its duration.

Accordingly, shock testing machine are provided that can impart relatively long duration acceleration with a wide range of magnitudes on objects being tested. The shock testing machine provide the means of rapidly mounting and dismounting objects to be tested on the machine platform and resetting the machine for the next test. The acceleration (shock loading) level to be achieved is readily adjusted and measured via adjusting and measuring the braking force that will be provided during the testing.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

Figure 2A:
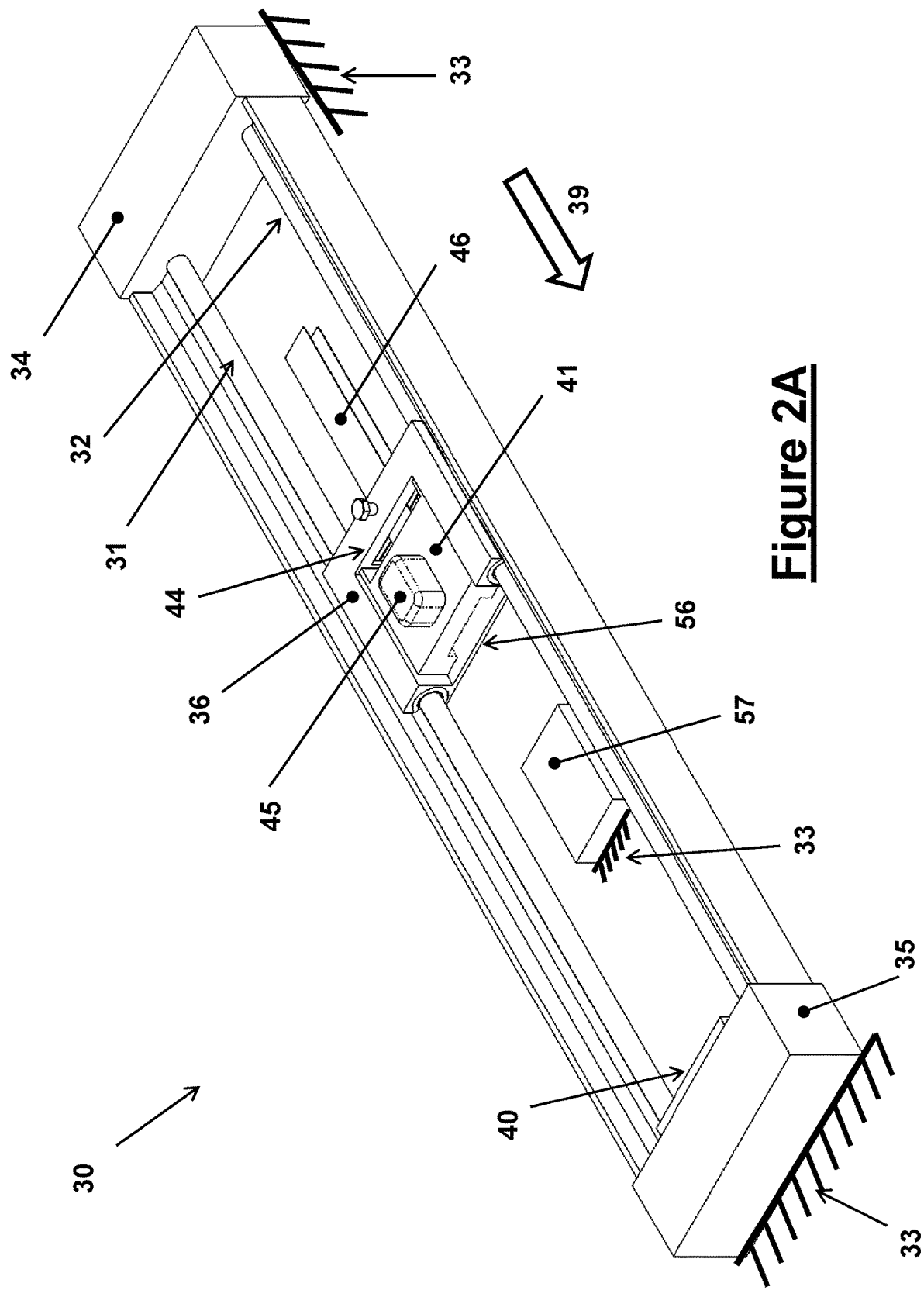
FIG. 2A illustrates the isometric view of the first embodiment of the mechanical shock testing machine.
Figure 2B:
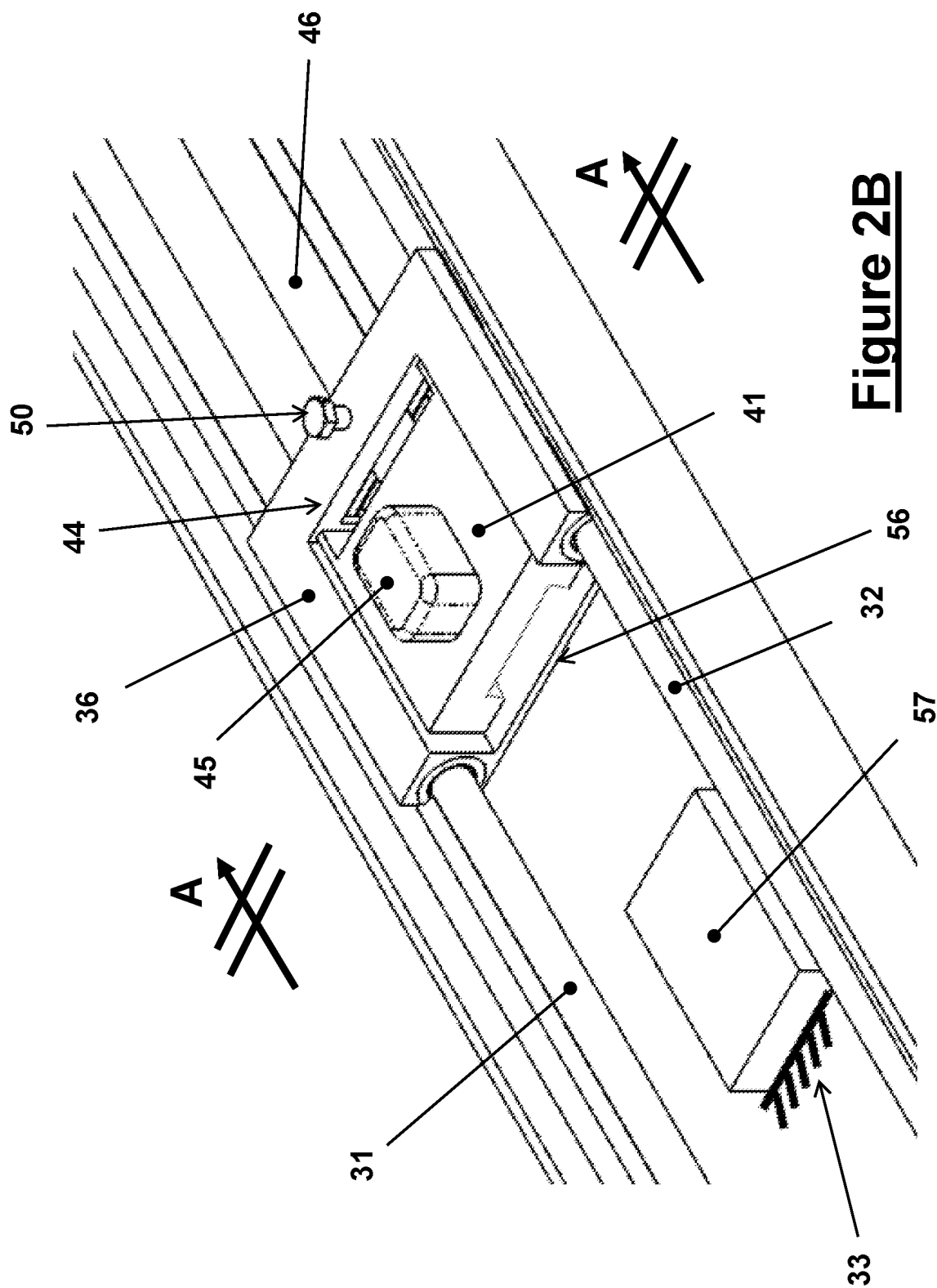
FIG. 2B illustrates a close up view of the test carriage and platform of the mechanical shock testing embodiment of FIG. 2A.

An isometric view of a first mechanical shock testing machine embodiment 30 is shown in FIG. 2A and a close-up view of its test carriage and platform is shown in FIG. 2B. The shock testing machine 30 is horizontally installed so that it could accommodate relatively long rails as it will be described but may also be vertically installed when relatively low acceleration levels and durations are involved. The rails 31 and 32 are attached to the machine base (foundation) structure 33 (shown as ground) by rigid support structures 34 and 35. A carriage member 36 is provided with sleeve bearings 37 and 38 as shown in the cross-sectional view of FIG. 3 to travel along the rails 31 and 32 freely with minimal friction.

During shock loading test to be described later, the carriage member 36 is accelerated to a desired velocity from its right-most position in the direction of the arrow 39 as shown in FIG. 2A using one of the methods to be described. For the sake of safety, a proper shock absorber 40 is provided on the rigid support structure 35 in case braking elements fail to bring the carriage member 36 and the test platform 41 to which the object to be tested in shock loading is attached to a stop. The carriage member 36 is provided with the pocket 44 (FIGS. 2B and 3) for positioning the test platform 41. The pocket 44 may be provided with a low friction lining 51, FIG. 3, to allow the test platform 41 to slide inside the pocket 44 with minimal friction. The pocket 44 may also be provided with side lips (not shown) to prevent the test platform from accidentally coming out of the pocket while moving along the length of the pocket.

Figure 3:
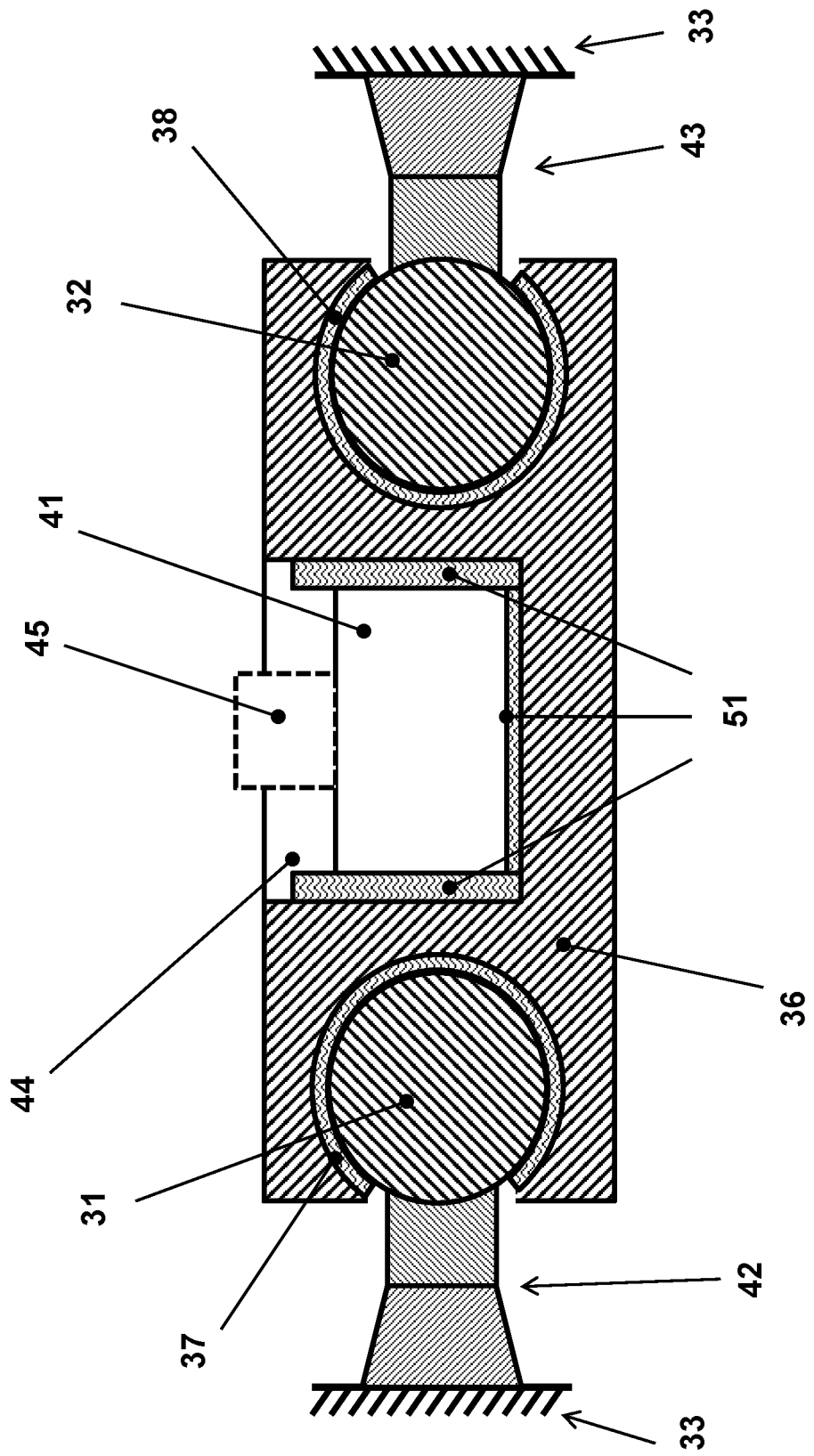
FIG. 3 illustrates the isometric view of the cross-sectional view A-A of the carriage assembly of the mechanical shock testing machine of FIG. 2B.

As can be seen in the cross-sectional view of FIG. 3, the carriage member 36 rides over the rails 31 and 32 with the provided bearing sleeves 37 and 38, respectively. The rails 31 and 32 are attached to the machine structure 33 (shown only as the ground) by support structures 42 and 43, respectively. The support structures 42 and 43 can be made out of solid steel or stainless steel to be very rigid. The machine structure 33 can also be made out of heavy structural steel and is firmly attached to a concrete slab to withstand the testing shock loading with negligible vibration.

As can be seen in the cross-sectional view of FIG. 3, the rail bearings are positioned in the carriage member 36 such that the center of mass of the carriage member 36 is positioned essentially in the plane of long axes of the rails 31 and 32 so that as the carriage member 36 is being subjected to shock testing deceleration pulse, the carriage member would not tend to tip over. In addition, the test platform 41 inside the pocket 44 of the carriage member 36 is used to carry the test objects, such as component 45 shown with dashed lines, to which the test objects are firmly attached so that they would experience essentially the same shock loading as the test platform 41 during testing as described later.

Figure 4:
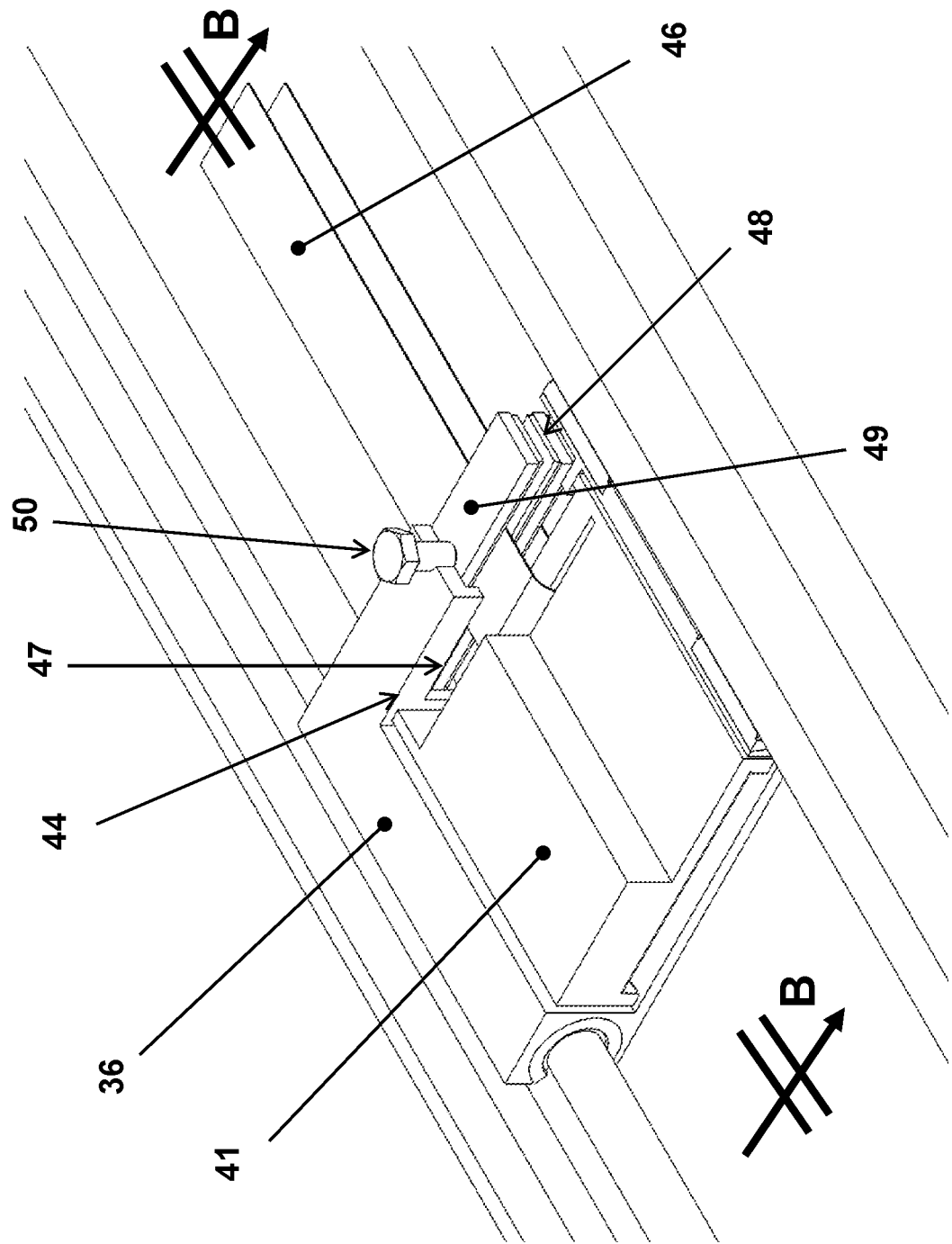
FIG. 4 illustrates the isometric view of the mechanical shock testing machine embodiment of FIG. 2B with a cut-away view of the braking mechanism section of the machine.

FIG. 4 illustrates a close-up isometric view of the test carriage and platform of the mechanical shock testing machine embodiment 30 of FIG. 2B with a cut-away view of the braking mechanism section of the machine. As can be seen in the cut-away section of the FIG. 4, the test platform 41 is provided with at least one braking strip member 46, which is fixedly attached to the back of the test platform as viewed in the isometric view of FIG. 4 and the cross-sectional view B-B of FIG. 5. High friction pads 48 are then provided between the braking strip members 46 and between the braking strip members 46 and the surface 52 of the carriage member 36 and the pressure plate 49 as shown in more detail in the cross-sectional view of FIG. 5. The section 47 of the carriage member 36 is provided for housing the braking mechanism of the present mechanical shock loading machine embodiment 30 of FIG. 2B. The pressure adjustment screws 50, FIGS. 4 and 5, are used to adjust the braking pads 48 pressure against the surfaces of the at least one braking strip member 46 to allow the friction force resisting its movement relative to the carriage member 36 to be adjusted.

In general, the brake pads 48 are fixedly attached to the surface 52 and the bottom surface of the pressure plate 49 using commonly used adhesives. Stops (not shown for the sake of clarity) are also provided on the side 53 of the carriage member 36 and the side 54 of the pressure plate to prevent the brake pads 48 that are positioned between the strip members 46 from sliding out as the strip members are pulled (to the left as viewed in FIG. 5) by the test platform 41 during the acceleration shock loading tests.

Figure 5:
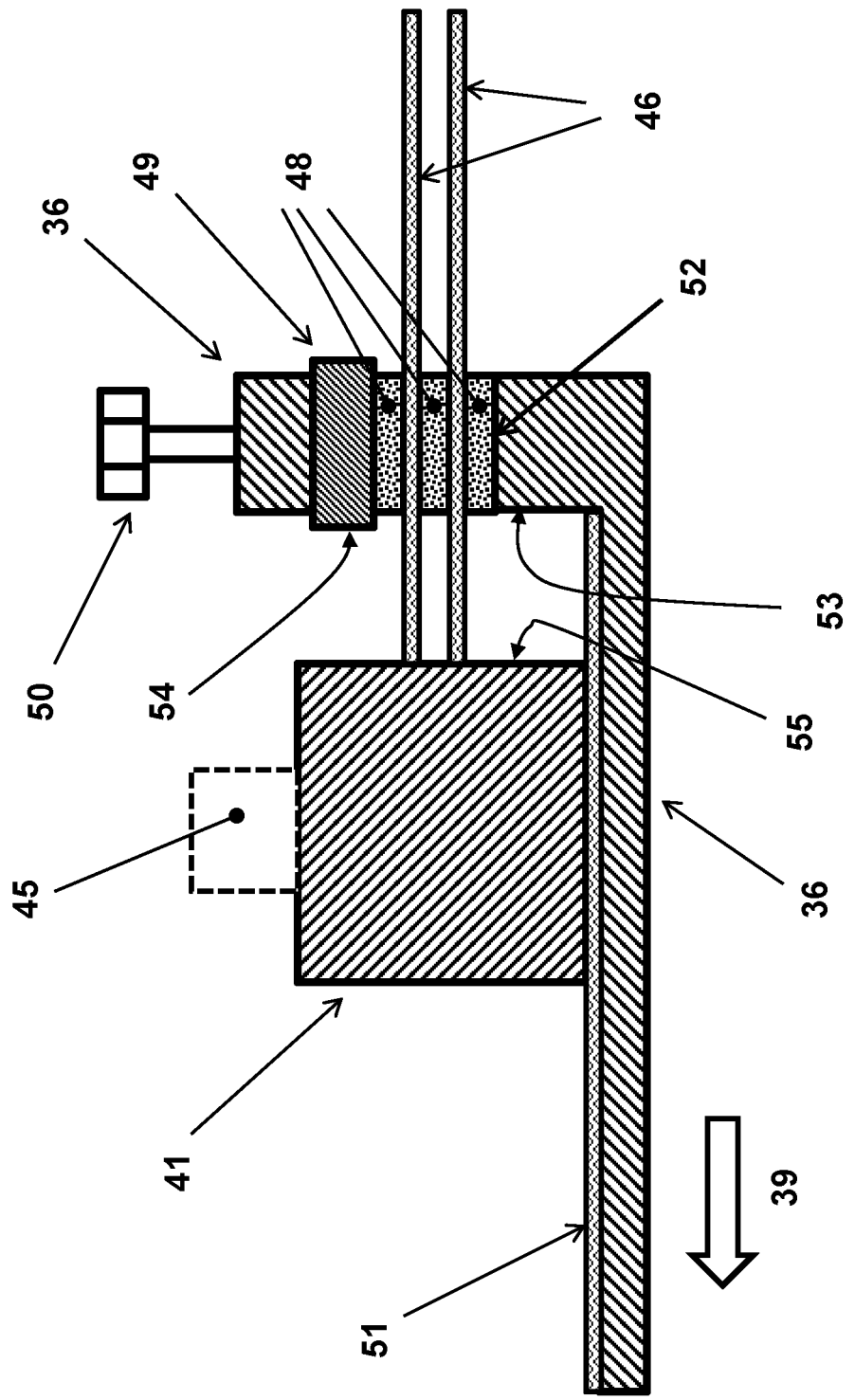
FIG. 5 illustrates the cross-sectional view B-B of the isometric view of FIG. 4.

To perform shock testing, the components 45 to be tested are fixedly attached to the test platform 41, FIGS. 3 and 5. The pressure adjustment screws 50 are then used to adjust the pressure on the braking pad 48 to the level that is needed to achieve the required friction force level on the braking strip members 46 as the test platform begins to move to the left relative to the carriage member 36 as described later during the acceleration shock loading test. The friction force adjustment can be done by providing a force gage assembly (not shown) between the surface 55 of the test platform 41 and the surface 53 of the carriage member 36, which is provided with an adjustable wedging member to tend to move the test platform 41, i.e., to separate the two surfaces 55 and 53. The provided friction force is then measured as the test platform begins to move. Such screw adjusted wedging mechanisms are well known in the art and are used to open gaps or pry open space between certain structures. The friction force may obviously be also adjusted by trial and error with the application of short duration acceleration pulses as described below.

The carriage member 36 is then accelerated to a desired velocity from its right-most position in the direction of the arrow 39 as shown in FIGS. 2A and 5 using one of the methods to be described. Then as can be seen in the isometric view of FIG. 2B, the side 56 of the carriage member 36 reaches the stop 57 and essentially comes to a quick stop. The stop 57 is provided on the shock loading machine structure 33 and can be provided with a shock absorber or other kinetic energy absorbing members to prevent the carriage member 36 from bouncing back as it is brought to a stop.

The level of the force that accelerates the carriage member 36 and its duration are selected to achieve the desired carriage member velocity as the side 56 of the carriage member reaches the stop 57.

Now as the carriage member 36 comes to a stop against the stop 57, the kinetic energy stored in the test platform 41, the braking strip members 46, and the attached components 45 that are being tested (hereinafter referred to as just the test platform) would continue to move in the direction of the arrow 39, FIGS. 2A and 5, since they are not affected by the stopping of the carriage member 36. However, the friction forces produced by the brake pads 48 on the braking strip members 46 would begin to decelerate the test platform 41 until it comes to a complete stop, i.e., until all its kinetic energy is converted to heat, i.e., by the work done by the friction force.

It is appreciated that if the initial velocity of the test platform 41 as the carriage member 36 comes to a stop and the friction force begins to act on it is $V_0$; the total mass of the test platform 41 (including those relatively small masses of the braking strip members 46 and the attached components 45) is m; and the friction force generated by the brake pads 48 on the braking strip members 46 is $F_f$, then equating the initial kinetic energy of the moving mass work done by the friction force to bring the moving mass to stop yields the following expression:

$$(½)mV_0^2 = F_f d \quad (1)$$

where d is the total distance travelled by the mass m inside the pocket 44 of the carriage member 36. Thus, the total distance d travelled by the mass m inside the pocket 44 is given by:

$$d = \frac{mV_0^2}{2F_f} \quad (2)$$

It is also appreciated that since the friction force $F_f$ is essentially constant, therefore the test platform 41 (mass m) is subjected to a constant deceleration a given by:

$$a = \frac{F_f}{m} \quad (3)$$

And the duration of time t that the test platform 41 (mass m) is subjected to the acceleration a, equation (3) becomes:

$$t = \frac{V_0}{a} = \frac{mV_0}{F_f} \quad (4)$$

It is appreciated the braking mechanism described above would apply an essentially constant deceleration pulse (shock) indicated by the equation (3) to the object 45 that is being tested as described above, FIGS. 2A, 4 and 5. In addition, the duration of the deceleration pulse can be increased by simply increasing the initial velocity $V_0$ of the carriage member 36 as the side 56 of the carriage member 36 reaches the stop 57 and essentially comes to a quick stop.

Figure 1:
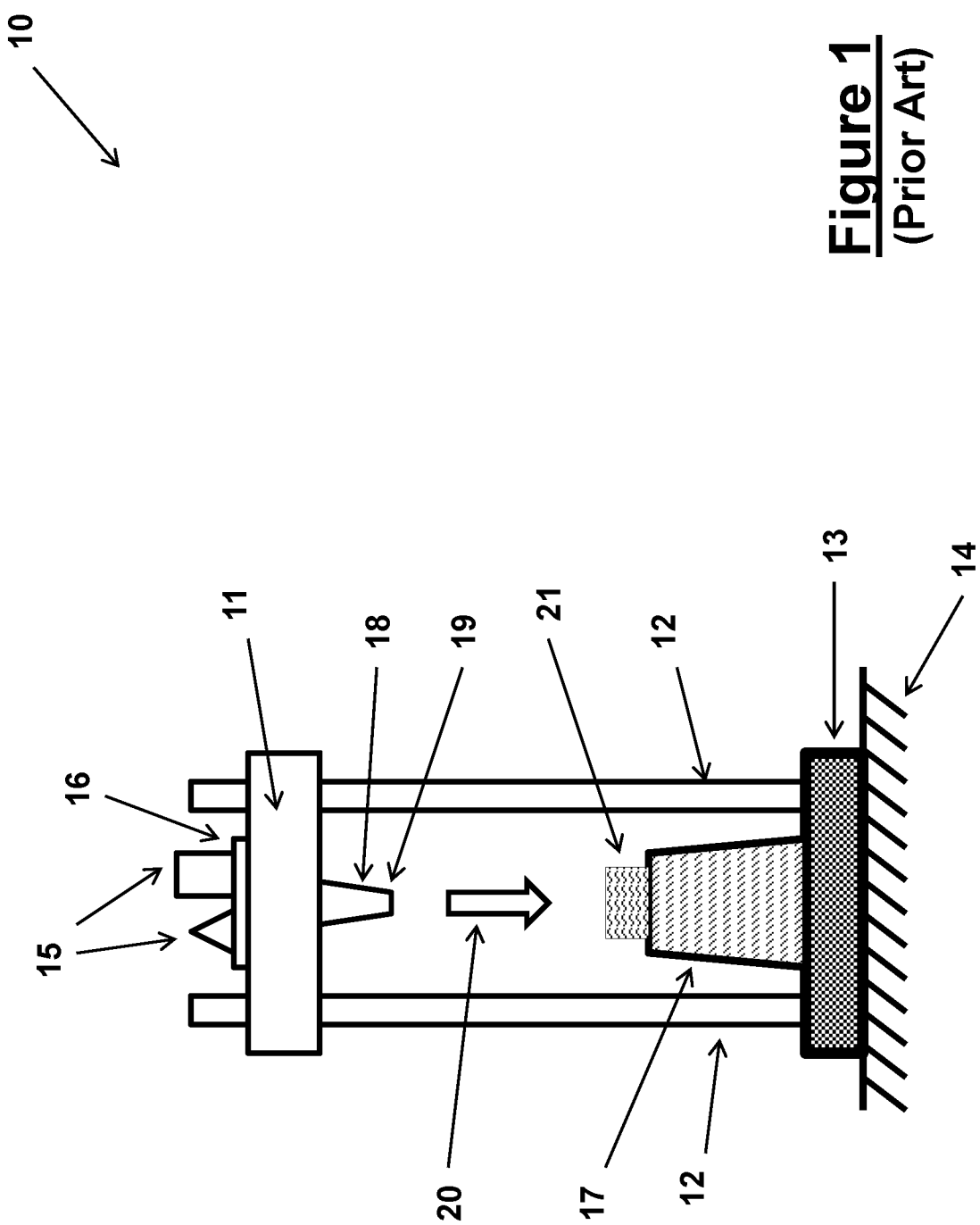
FIG. 1 illustrates the basic design of a mechanical shock testing machine of prior art.

With the disclosed mechanical shock testing machine embodiment 30, relatively long deceleration pulse durations can be achieved since the length of the pocket 44 (length is considered to be measured in the direction of the arrow 39, FIGS. 2A and 5) can be made long enough to accommodate the acceleration duration. For example, if the shock loading acceleration is a=500 G with a duration of t=3 milliseconds, then the total distance d that the test platform 41 travels inside the pocket 44 becomes:

$$d = 0.5a\ t^2 = (0.5)(500 \times 9.8)(3 \times 10^{-3})^2 = 0.022\ m$$

which is very small. This is in contrast with the amount of deformation that impact pads element 21 of the prior art mechanical testing machines shown in FIG. 1 can practically provide as was previously described, thereby significantly limiting the duration of deceleration pulses that the prior art mechanical shock testing machines can provide. That is in addition to the fact that currently available impact pads cannot provide a constant deceleration rate.

However, it is appreciated that when the required acceleration level is higher and particularly when the required acceleration duration is longer, the total distance d that the test platform 41 has to travel inside the pocket 44 becomes significant, thereby requiring a significantly longer pocket 44 (length is considered to be measured in the direction of the arrow 39, FIGS. 2A and 5) and thereby significantly heavier carriage member 36. The heavier carriage member 36 would in turn require a significantly higher applied force to accelerate the carriage member to the required velocity $V_0$ as was previously described. For example, if the shock loading acceleration is increased to a=1500 G from the above a=500 G and its duration is increased to t=10 milliseconds from t=3 milliseconds, then the total distance d that the test platform 41 travels inside the pocket 44 becomes:

$$d = 0.5a\ t^2 = (0.5)(1500 \times 9.8)(10 \times 10^{-3})^2 = 0.735\ m$$

which is over 30 times longer that the above case and that would result in a very heavy carriage member. The mechanical shock loading machine embodiment 30 of FIG. 2A may, however, be modified to address this shortcoming. Such a modified mechanical shock loading machine embodiment is shown in the isometric view of FIG. 6 and is identified as the embodiment 60.

Figure 6:
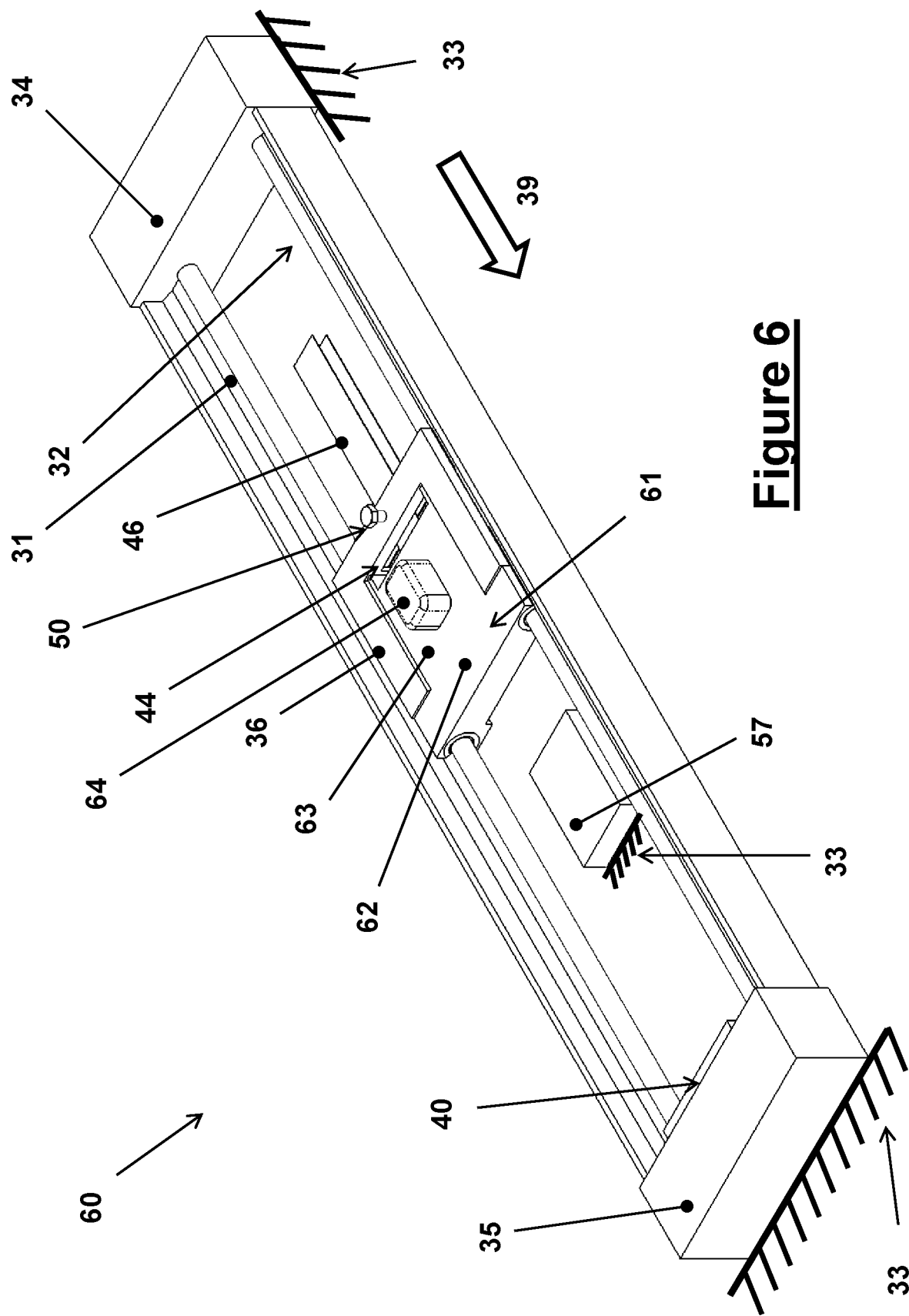
FIG. 6 illustrates the isometric view of the second embodiment of the mechanical shock testing machine.

The isometric view of the modified mechanical shock loading machine embodiment 60 is shown in the isometric view of FIG. 6. All components of the shock loading machine embodiment 60 of FIG. 6 are identical to those of the embodiment 30 of FIG. 2A except for its test platform 61 (41 in FIGS. 2A and 2B). In the mechanical shock loading machine embodiment 60, the test platform 61 is seen to consist of a frontal portion 62 and a tail portion 63. The tail portion 63 of the test platform 61 is configured to ride in the pocket 44 of the carriage member 36 as was previously described for the test platform 41 of the mechanical shock loading machine embodiment 30 of FIG. 2A. The frontal portion 62 of the test platform 61 is constricted to ride on the rails 31 and 32 with the provided bearings bearing sleeves 37 and 38 as shown in the cross-sectional view of FIG. 3.

To perform shock testing, the components 64 to be tested are fixedly attached to the test platform 61, FIG. 6. The pressure adjustment screws 50 are then used to adjust the pressure on the braking pad 48 to the level that is needed to achieve the required friction force level on the braking strip members 46 as the test platform begins to move to the left relative to the carriage member 36 as described later during the acceleration shock loading test, FIGS. 5 and 6. The friction force adjustment can be done as was previously described for the embodiment 30 of FIG. 2A by providing a force gage assembly (not shown) between the surface 55 of the test platform 41 (61 in FIG. 6) and the surface 53 of the carriage member 36, which is provided with an adjustable wedging member which tends to separate the two surfaces.

The provided friction force is then measured as the test platform begins to move. Such screw adjusted wedging mechanisms are well known in the art and are used to open gaps or pry open space between certain structures. The friction force may obviously be also adjusted by trial and error with the application of short duration acceleration pulses as was previously described for the embodiment 30 of FIG. 2A.

The carriage member 36 is then accelerated to a desired velocity from its right-most position in the direction of the arrow 39 as shown in FIG. 6 using one of the methods to be later described. Then as can be seen in the isometric view of FIG. 6, the frontal side 56 (positioned under the frontal section 62 of the test platform 61 in FIG. 6 but clear shown in FIG. 2B) of the carriage member 36 reaches the stop 57 and essentially comes to a quick stop. The stop 57 is provided on the shock loading machine structure 33 and can be provided with a shock absorber or other kinetic energy absorbing members to prevent the carriage member 36 from bouncing back as it is brought to a stop.

The level of the force that accelerated the carriage member 36 and its duration are selected to achieve the desired carriage member velocity as the side 56 of the carriage member reaches the stop 57.

Now as the carriage member 36 comes to a stop against the stop 57, the kinetic energy stored in the test platform 61, the braking strip members 46, and the attached components 64 that are being tested (hereinafter referred to as just the test platform) would continue to move in the direction of the arrow 39, FIG. 6, since they are not affected by the stopping of the carriage member 36. However, the friction forces produced by the brake pads 48 on the braking strip members 46, FIG. 5, would begin to decelerate the test platform 61 until it comes to a complete stop, i.e., until all its kinetic energy is converted to heat, i.e., by the work done by the friction force.

In the isometric view of the mechanical shock loading machine embodiment 60, the test platform 61 is shown to consist of a frontal portion 62 and a tail portion 63, which is configured to ride in the pocket 44 of the carriage member 36. In general, the tail portion 63 is provided so that as the carriage member 36 together with the test platform are accelerated to the aforementioned desired velocity $V_0$ before the carriage member 36 is stopped, the test platform would undergo minimal lateral movements relative to the carriage member 36. It is therefore appreciated that the length of engagement between the tail section 63 of the test platform 61 and the pocket 44 does not have to be long to serve this purpose. It is also appreciated that when the lateral movements are not of concern, particularly for tests requiring lower velocities $V_0$, then the tail section 63 may be eliminated.

It is appreciated that since the mechanical shock loading machine configuration of the embodiment 60 of FIG. 6 does not limit the length of travel of the test platform 61 to the length of the pocket 44 of the carriage member 36 as was described for the embodiment 30 of FIG. 2A and that since the rails 31 and 32 can have any required length past the stop 57, therefore the distance d, equation (2), that the test platform 61 can travel before coming to a stop essentially unlimited. As a result, for a specified shock acceleration level, the shock duration would only be limited to the initial velocity $V_0$, equation (4), when the carriage member 36 is brought to a stop by the stop 57.

In the shock loading machine embodiment 60 of FIG. 6, the test platform 61 is shown to ride on the rails 31 and 32 over which the carriage member 36 also rides. However, in many shock loading machines, it is highly desirable that the test platform 61 be as lightweight and therefore small as possible. In such cases, the test platform may be provided with its own rails, usually positioned between the rails 31 and 31, thereby allowing the test platform to be narrower and also provide higher ratio between the rail contact length and the distance between the rails for higher stability during its motion before and during deceleration.

In the above mechanical shock loading machine embodiments, the carriage members (36 in the embodiments 30 and 60 of FIGS. 2A and 6) are accelerated at a relatively slow rate from a stationary position to a desired velocity, at which time the carriage member is suddenly stopped to allow the test platforms (41 and 61 in the embodiments 30 and 60 of FIGS. 2A and 6, respectively) to be decelerated at a predetermined rate and for a prescribed duration. The task of accelerating the carriage members may be accomplished using several methods, including the following three methods.

Figure 7:
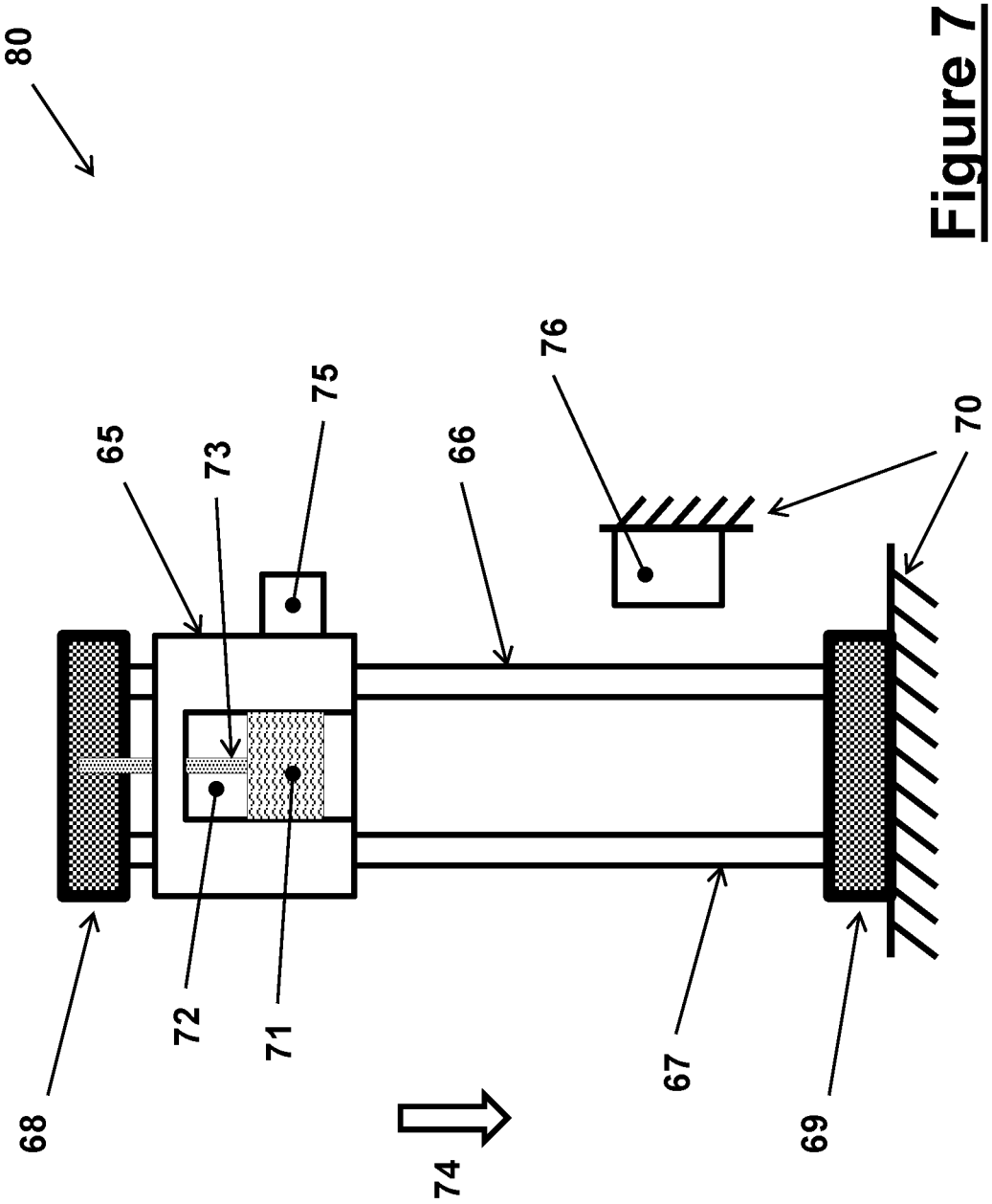
FIG. 7 illustrates the first method of accelerating the carriage member of the mechanical shock testing machine to the desired velocity.

The first method of accelerating the carriage member of the mechanical shock testing machine to the desired velocity is shown in the schematic of FIG. 7. This embodiment is identified as the embodiment 80 as can be seen in FIG. 7. In this method, the mechanical shock loading machine is installed vertically. This method is used for cases in which relatively low shock (deceleration) levels or short shock durations are required for the test. In the embodiment of FIG. 7, the carriage member 65 (36 in the embodiments of FIGS. 2A and 6) similarly rides on vertically mounted rails 66 and 67. The rails are mounted firmly in a top and a bottom supports 68 and 69, respectively. The bottom support member 69 is generally large and massive enough to provide stability and may also be firmly attached to a properly sized foundation or machine structure 70 (shown as ground). The carriage member 65 is shown to be similarly provided with the pocket 72 (44 in the embodiments of FIGS. 2A and 6), within which the test platform 71 (41 and 61 in the embodiments of FIGS. 2A and 6, respectively) would ride as was previously described. The at least one braking strip members 73 (46 in the embodiments of FIGS. 2A and 6) and the braking mechanism elements (not shown) are provided similar to the embodiments of FIGS. 2A and 6.

In the schematic of the embodiment 80 of FIG. 7, the test platform 71 is shown to be configured as shown in the embodiment 30 of FIG. 2A, i.e., it only rides in the provided pocket 72 of the carriage member 65. It is, however, appreciated that the test platform 71 may also be configured as shown in the embodiment 60 of FIG. 6 to ride on the rails 66 and 67.

To perform a shock loading test, the object to be tested is fixedly attached to the test platform 71. The carriage member 65 is then released from a predetermined height, so that as it is accelerated down in the direction of the arrow 74 under gravitational acceleration, at the time that the carriage side member 75 comes to a stop against the stop member 76 (which is fixedly attached to the machine structure 70), it has gained the desired initial velocity $V_0$, equation (4). It is appreciated that the height of travel of the carriage member 65 under the gravitational acceleration determines the initial velocity $V_0$ as was previously indicated. In general, the carriage member 65 is held to the top support 65 at the desired height by a quick release mechanism (not shown), which is then released by the pulling of a cable or string after removing its safety lock pin. Such quick release mechanisms with safety pins are well known in the art. Once the carriage member 65 has been stopped by the stop 76, the test platform 71 together with its attached test object is decelerated by the provided friction forces acting on the at least one braking strip 73 as was described for the embodiments 30 and 60 of FIGS. 2A and 6.

Figure 8:
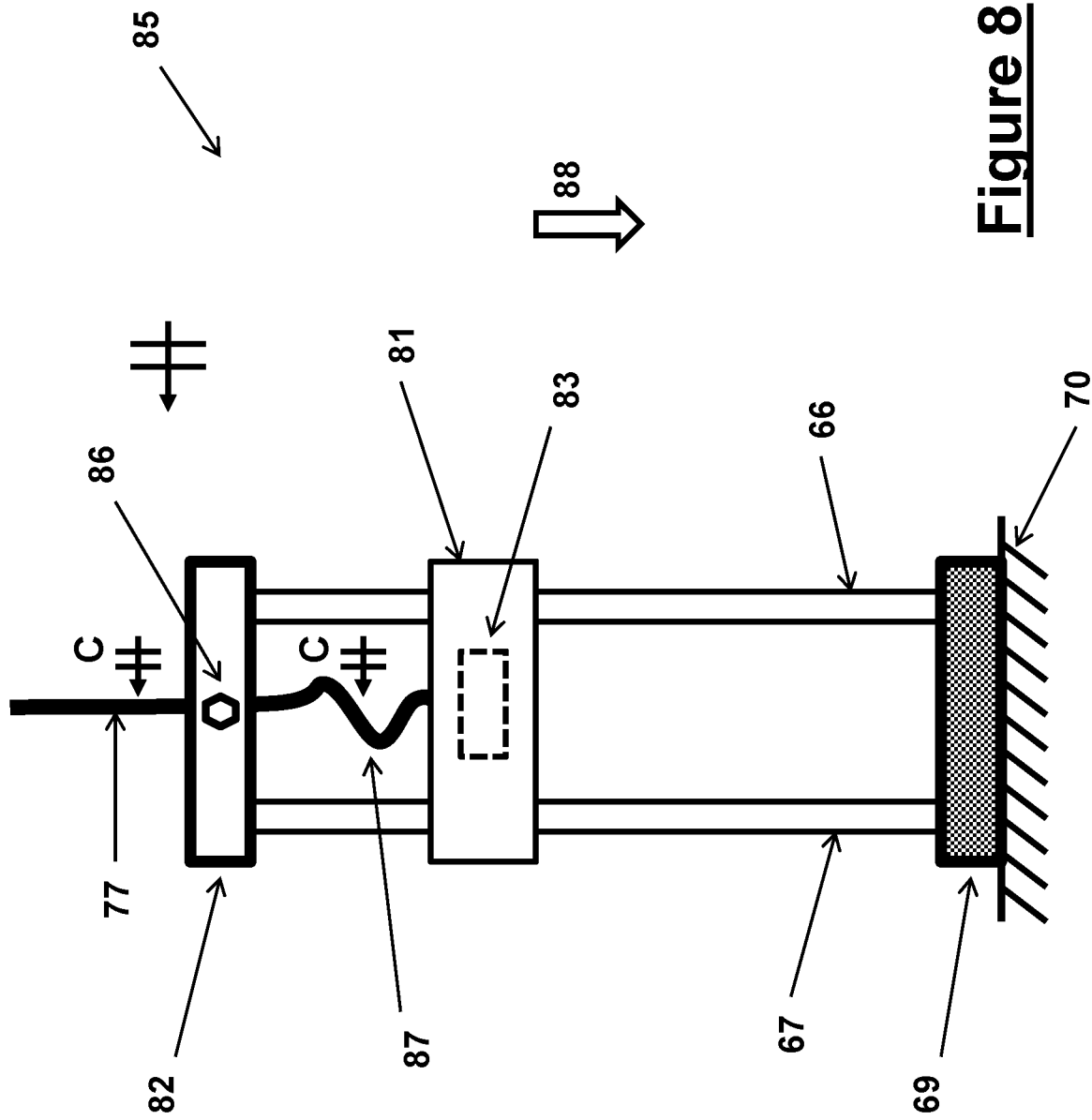
FIG. 8 illustrates a modified version of the vertical shock loading machine embodiment of FIG. 7.

A modified version of the vertical shock loading machine embodiment 80 is shown in FIG. 8. The mechanical shock loading machine is similarly installed vertically and is identified as the embodiment 85. All components of the shock loading machine embodiment 85 are identical to those of the embodiment 80 of FIG. 7 except for its carriage assembly 81 and the top support structure 82. In the embodiment 85, the carriage member 81 similarly rides on vertically mounted rails 66 and 67. The rails are mounted firmly in a top and a bottom supports 82 and 69, respectively. The bottom support member 69 is generally large and massive enough to provide stability and may also be fixedly attached to a properly sized foundation or machine structure 70 (shown as ground).

In the mechanical shock loading machine embodiment 85 of FIG. 8, the carriage member 81 also serves as the test platform to which the object 83 that is to be tested is fixedly attached. The at least one braking strip members 77 (73 in the embodiment of FIG. 7) and the braking mechanism elements, which are similar to those shown in the cross-sectional view B-B of FIG. 5, are as shown in the cross-sectional view C-C of FIG. 9 as provided on the top support 82.

Figure 9:
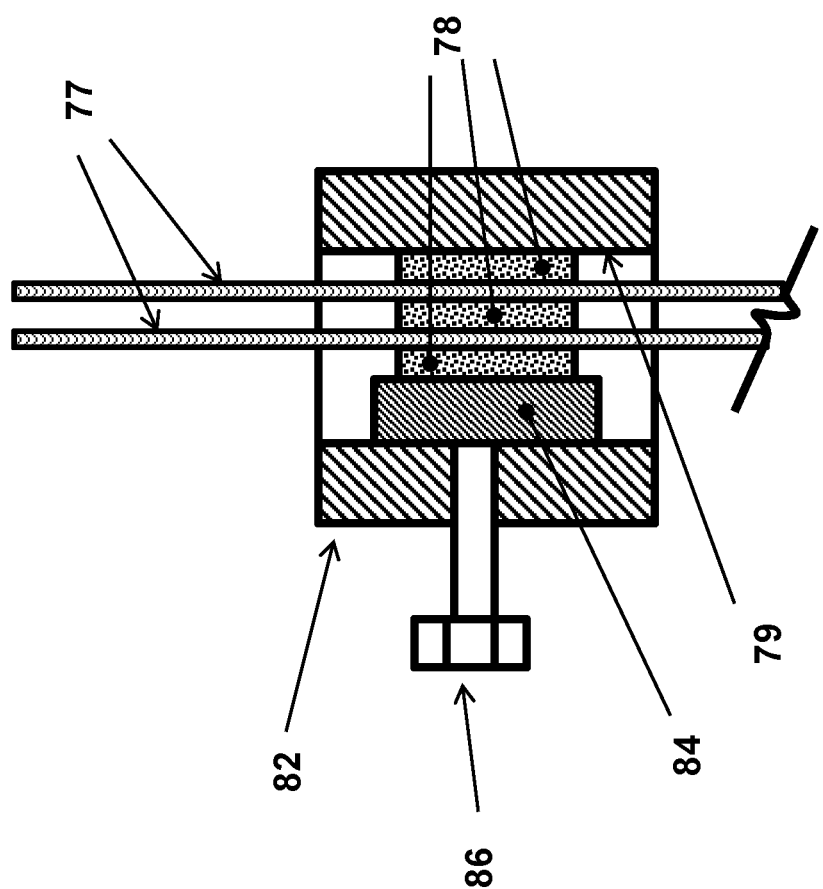
FIG. 9 illustrates the cross-sectional view C-C of the braking mechanism of the shock loading machine embodiment of FIG. 8.

As can be seen in the cut-away section of the FIG. 9, the top support member 82 is provided with at least one braking strip member 77, which is fixedly attached to the back of the carriage member 81 as can be seen in FIG. 8. High friction pads 78 are then provided between the braking strip members 77 and between the braking strip members 78 and the surface 79 of the carriage member 82 and the pressure plate 84 as shown in more detail in the cross-sectional view of FIG. 9. The pressure adjustment screws 86, FIGS. 8 and 9, are used to adjust the braking pads 84 pressure against the surfaces of the at least one braking strip member 77 to allow the friction force resisting its movement relative to the top support member 82 to be adjusted.

To perform a shock loading test, the object to be tested 83 is fixedly attached to the carriage member 81, FIG. 8. The carriage member 81 is then raised as shown in FIG. 8 to allow the section 87 of the at least one braking strip member 77 between the top member 82 and the carriage member 81 to slacken the desired length to allow the carriage member 81 to travel down in the direction of the arrow 88 the desired distance before the at least one braking strip member 77 becomes taut and begins to be pulled through the braking pads 78, FIG. 8, and the carriage member 81 begins to be decelerated as was described for the embodiments 30 and 60 of FIGS. 2A and 6, respectively.

To perform a shock loading test, the carriage member 81 is therefore released from a predetermined height, so that as it is accelerated down in the direction of the arrow 88 under gravitational acceleration, at the time that the at least one braking strip member becomes taut, it has gained the desired initial velocity $V_0$, equation (4). It is appreciated that the height of travel of the carriage member 81 under the gravitational acceleration determines the said initial velocity $V_0$ as was previously indicated. In general, the carriage member 81 is held to the top support 82 at the desired height by a quick release mechanism (not shown), which is then released by the pulling of a cable or string after removing its safety lock pin. Such quick release mechanisms with safety pins are well known in the art. Once the section 87 of the at least one braking strip member 71 has become taut, the carriage member 81 together with its attached test object 83 are decelerated by the provided friction forces acting on the at least one braking strip 73 as was described for the embodiments 30 and 60 of FIGS. 2A and 6.

In mechanical shock testing machines, particularly when higher acceleration shock loading and durations are required, other means such as pre-tensioned bungee cords or pneumatic or electric drives may be used to achieve significantly higher carriage member velocities, for example for the embodiments 30, 60 and 80 of FIGS. 2A, 6 and 7, respectively. The aforementioned second and third methods used for this purpose are intended to refer to the methods of using pre-tensioned bungee cords to accelerate the carriage members of the various embodiments as described below.

The indicated second and third methods are very similar and both involves the release of the mechanical shock loading machine carriage member after pre-tensioning at least one bungee that connects the carriage member to the (usually base) structure of the machine. The main difference between the two methods is the process of pre-tensioning the bungees. The second and methods of pre-tensioning at the at least on bungee are shown in the schematics of FIGS. 10 and 11, respectively, and are shown how the methods apply to shock loading machine embodiments by illustrating how they are configured for accelerating carriage members.

Figure 10:
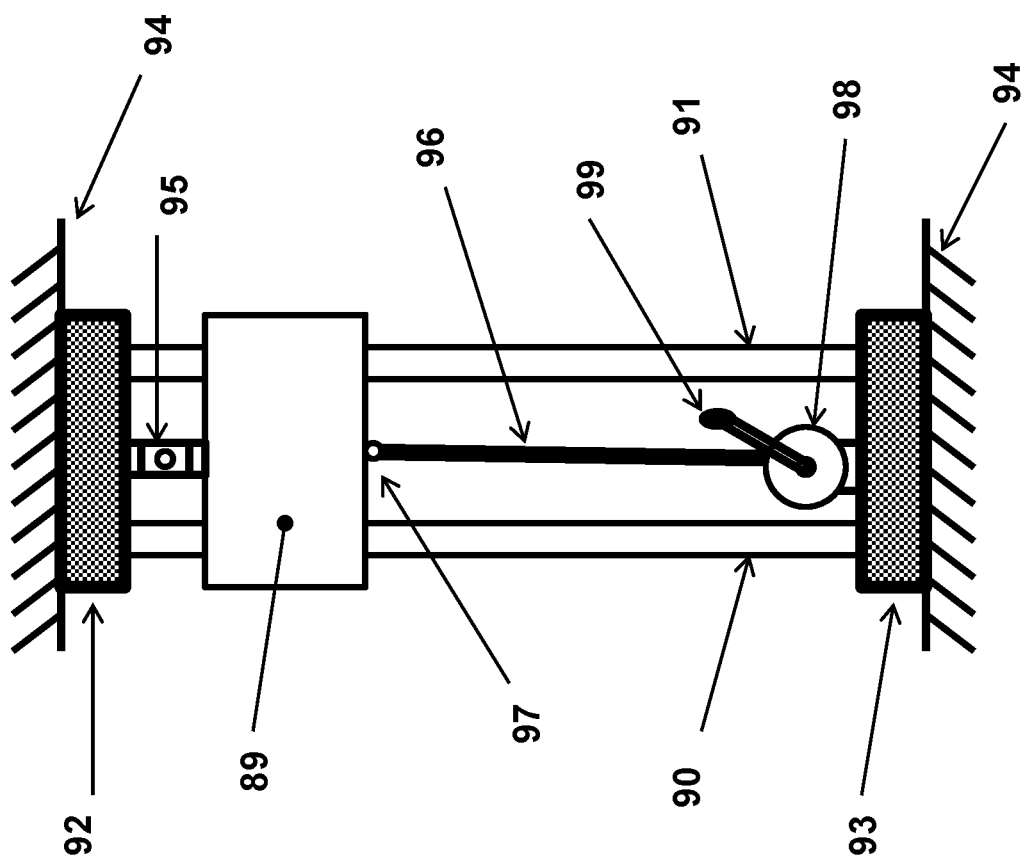
FIG. 10 illustrates the second method of accelerating the carriage member of the mechanical shock testing machine to the desired velocity.
Figure 11:
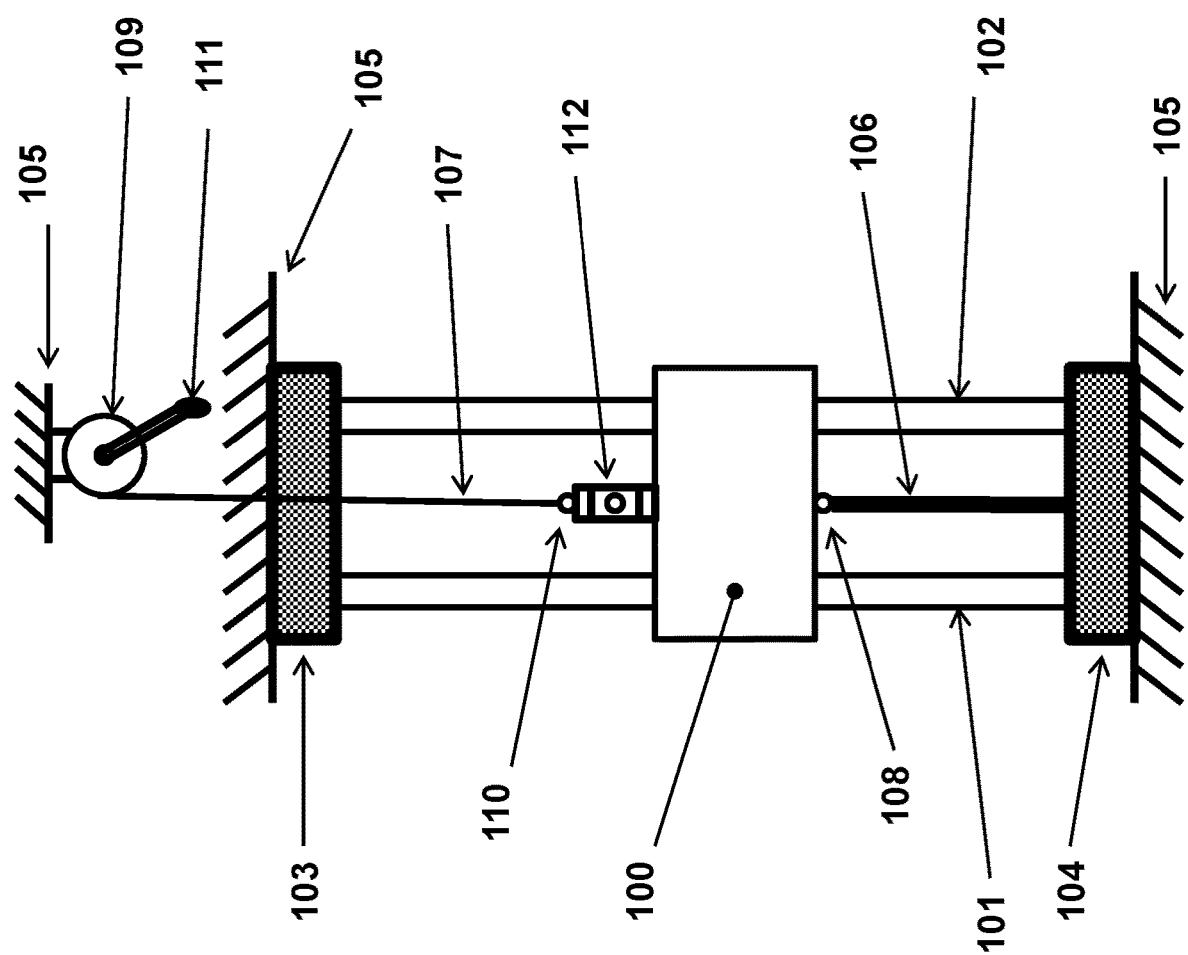
FIG. 11 illustrates the third method of accelerating the carriage member of the mechanical shock testing machine to the desired velocity.

The second method of accelerating the carriage member of the mechanical shock testing machine to the desired velocity is shown in the schematic of FIG. 10. In this schematic of the shock loading machine, only the mechanism of accelerating the carriage member 89 using this method is shown. In this method, the mechanical shock loading machine may be installed vertically, in which case the pre-tensioned bungee(s) provides additional downward accelerating force in addition to the force due to the gravitational acceleration. The mechanical shock loading machine may also be installed horizontally, in which case the only force that would accelerate the carriage member is provided by the pre-tensioned bungee(s). It is appreciated that the horizontally installed shock loading machines have the advantage of essentially unlimited rail travel over vertically installed machines and are therefore not limited to low G acceleration and relatively short duration tests.

In shock loading machines using this method of accelerating the carriage member to the desired velocity, the carriage member 89 still rides on mounted rails 90 and 91. The rails are mounted firmly in a top and a bottom supports 92 and 93, respectively. The top and bottom support members 92 and 93 are generally rigid and massive enough to provide stability and may also be fixedly attached to properly sized foundation or machine structure 94 (shown as ground).

The carriage member 89 is initially attached to the support member 92 by a quick release mechanism 95 as shown in FIG. 10. Such quick release mechanisms with provided safety arming pin or the like are widely used and known in the art. The at least one bungee cord 96 is then attached to the opposite side of the carriage member 89 on one end, usually via an eyelet 97, and the other end to a collecting winch 98. The winch 98 is used to collect the bungees 96 and is operated either manually by the rotation of the handle 99 or via an electric motor via a speed reduction gearing commonly used in such winches. A load cell may also be provided, for example between the quick release mechanism and the support 92, to measure the force applied by the bungees to the carriage member as the winch winds the bungees and thereby increases its pre-tension and thereby provide the means of adjusting it to the desired level.

It is appreciated that in many cases, the winch may be attached past the support 93 to allow long enough bungee cords to be used to accelerate the carriage member 89 long enough to achieve high initial velocity $V_0$, equation (1), before the friction mechanisms begins to decelerate the test platform (41, 62 and 71 FIGS. 2A, 6 and 8) of the machine.

To perform a shock loading test, the object to be tested is fixedly attached to the test platform (41, 62 and 71 FIGS. 2A, 6 and 8). The carriage member 89 is fixed to the support 92 via the quick release mechanism 95. The winch 98 is then used to collect the bungee(s) to pre-tension it to the desired force level as measured by the aforementioned force gage. The quick release mechanism would then release the carriage member 89 by the operator, usually by pulling a release cord after removing a safety pin that prevents accidental releasing of the quick release mechanism. The shock loading machine (e.g., embodiments 30, 60 and 80 of FIGS. 2A, 6 and 7) would have their shock loading function as was previously described for each of the embodiments.

The third method of accelerating the carriage member of the mechanical shock testing machine to the desired velocity is shown in the schematic of FIG. 11. In this schematic of the shock loading machine, only the mechanism of accelerating the carriage member 100 using this method is shown. Similar to the embodiment of FIG. 10, the mechanical shock loading machine may be installed vertically, in which case the pre-tensioned bungee(s) provides additional downward accelerating force in addition to the force due to the gravitational acceleration. The mechanical shock loading machine may also be installed horizontally, in which case the only force that would accelerate the carriage member is provided by the pre-tensioned bungee(s). It is appreciated that the horizontally installed shock loading machines have the advantage of essentially unlimited rail travel over vertically installed machines and are therefore not limited to low G acceleration and relatively short duration tests.

In shock loading machines using this method of accelerating the carriage member to the desired velocity, the carriage member 100 still rides on mounted rails 101 and 102. The rails are mounted firmly in a top and a bottom supports 103 and 104, respectively. The top and bottom support members 103 and 104 are generally rigid and massive enough to provide stability and may also be fixedly attached to properly sized foundation or machine structure 105 (shown as ground).

The carriage member 100 is initially held in its "neural" position by the at least one bungee cord 106 on one end and the winch cable 107 on the other as shown in FIG. 11. The winch 109 is attached to the machine structure or its foundation 105 as shown in the schematic of FIG. 11. In this positioning of the carriage member 100, the at least one bungee cord 106 and the winch cable 107 are essentially not tensioned. The at least one bungee cord is attached on one end to the carriage member 100 via the eyelet 108 and to the support 104 (or other further positioned anchoring location—not shown) on the other end. The winch cable 107 is also attached to the carriage member 100 via an eyelet 110 and the quick release mechanism 112. Such quick release mechanisms with provided safety arming pin or the like are widely used and known in the art. A load cell may also be provided (not shown), for example between the quick release mechanism 112 and the carriage member 100, to measure the force applied by the bungees to the carriage member as the winch winds the winch cable to pre-tension the bungees 106 for a shock loading test.

The winch 109 is used to collect the winch cord 107, pulling the carriage member 100 towards it, thereby extending the at least one bungee cord 106 and storing mechanical potential energy in it due to its elastic deformation. It is appreciated that the winch 109 may be either operated manually by the rotation of the handle 109 or via an electric motor via a speed reduction gearing (not shown) commonly used in such winches.

To perform a shock loading test, the object to be tested is fixedly attached to the test platform (41, 62 and 71 FIGS. 2A, 6 and 8). The bungees 106 and the winch cord 107 are attached to the carriage member 100 as shown in FIG. 11. The winch 98 is then used to collect the winch cable 107, moving the carriage member 100 towards the top support 103 and thereby extending the bungees 106. The bungees 106 are then extended to the desired tension level as measured by the aforementioned force gage. Then to perform the test, the operator would release the quick release mechanism, usually by pulling a release cord after removing a safety pin prevents accidental releasing of the quick release mechanism. The carriage member 100 is then released and the shock loading machine (e.g., embodiments 30, 60 and 80 of FIGS. 2A, 6 and 7) would function as was previously described for each of the embodiments.

It is appreciated that in many cases, the winch 109 and the bungees may be attached past the supports 103 and 104 to allow long enough bungee cords to be used to accelerate the carriage member 100 long enough to achieve high initial velocity $V_0$, equation (1), before the friction mechanisms begin to decelerate the test platform (41, 62 and 71 FIGS. 2A, 6 and 8) of the machine.

In the above embodiments, the friction force adjustment of the friction mechanisms is shown to be achieved by pressure adjustment screws (50 in FIGS. 4-6 and 86 in FIGS. 8 and 9). In practice, however, it is best to use an adjustable quick release mechanism, such as the mechanism used in locking plyers, to enable the user adjust the braking force as was described for the embodiments and then to quickly release the braking forces to reset the shock loading machine after each test.

In the above embodiments, the braking strip members (46 and 73 in FIGS. 2A and 7, respectively) are shown to be thin (e.g., 0.010" thick) and wide (e.g., 1.0" wide) spring steel strips. It is, however, appreciated that one may use various cables or other elements for this purpose. It is also appreciated that the braking strips may also be provided with varying thicknesses, thereby causing the friction force and thereby the imparted deceleration of the test platform to vary and form a prescribed profile, for example, a nearly half sine or a smoothened trapezoidal profile.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A shock testing machine comprising:
   a base;
   one or more rails supported by the base and extending in a testing direction;
   a test platform for holding an item to be shock tested;
   a carriage for carrying the test platform and being movable relative to the test platform along the one or more rails in the testing direction, the testing direction being a direction of movement of the carriage along the one or more rails;

a stop fixed to the base at a predetermined location, the stop being configured to directly engage with only the carriage to stop a movement of the carriage in the testing direction at the predetermined location while allowing the test platform to separate from the carriage in the testing direction and continue moving in the testing direction past the predetermined location; and a brake configured to decelerate the test platform after the test platform has been separated from the carriage by the stop, wherein the brake comprises one or more elongated members extending from the test platform in a braking direction opposite to the testing direction, the one or more elongated members being engageable with braking material disposed on the carriage such that when the carriage stops moving in the testing direction at the predetermined location and the test platform continues moving in the testing direction past the predetermined location, the at least one elongated member engages with the braking material to decelerate the testing platform.

2. The shock testing machine according to claim 1, wherein the stop comprises a member fixed at the predetermined location to interfere with a portion of the carriage to stop the carriage at the predetermined location when the carriage impacts the stop.

3. The shock testing machine according to claim 1, further comprising a liner disposed between the carriage and the test platform such that a first surface of the test platform contacts a second surface of the liner, the second surface of the liner having a lower coefficient of friction than corresponding surfaces of the carriage.

4. The shock testing machine according to claim 1, wherein the one or more rails having a cross-sectional center on a same plane as a center of mass of the carriage.

5. The shock testing machine according to claim 1, wherein the test platform is movable within a pocket formed in the carriage.

6. The shock testing machine according to claim 1, further comprising bearings provided between the one or more rails and the one of the test platform and the carriage.

7. The shock testing machine according to claim 1, wherein the carriage is supported by the one or more rails.

8. The shock testing machine according to claim 1, wherein the test platform is supported by the one or more rails.

9. The shock testing machine according to claim 1, wherein a braking force of the braking material against the one or more elongated members is adjustable to adjust a rate of the deceleration.

10. The shock testing machine according to claim 1, further comprising means for accelerating the carriage towards the stop.

* * * * *